United States Patent
Wu et al.

(10) Patent No.: US 11,873,221 B1
(45) Date of Patent: Jan. 16, 2024

(54) INTEGRATED SYSTEM AND METHOD FOR HYDROGEN PURIFICATION, STORAGE AND PRESSURIZATION

(71) Applicant: XI'AN JIAOTONG UNIVERSITY, Xi'an (CN)

(72) Inventors: Zhen Wu, Xi'an (CN); Zaoxiao Zhang, Xi'an (CN); Fusheng Yang, Xi'an (CN); Yuchen Yang, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 18/344,946

(22) Filed: Jun. 30, 2023

(30) Foreign Application Priority Data

Jul. 6, 2022 (CN) .......................... 202210853095.6

(51) Int. Cl.
 *C01B 3/50* (2006.01)
(52) U.S. Cl.
 CPC ...... *C01B 3/508* (2013.01); *C01B 2210/0015* (2013.01)
(58) Field of Classification Search
 CPC .................. C01B 3/508; C01B 2210/0015
 See application file for complete search history.

(56) References Cited

U.S. PATENT DOCUMENTS

| | | | | |
|---|---|---|---|---|
| 2017/0130901 | A1* | 5/2017 | Sloan | ........................ F17C 5/06 |
| 2020/0332783 | A1 | 10/2020 | Chaise | |

FOREIGN PATENT DOCUMENTS

| | | |
|---|---|---|
| CN | 102616741 A | 8/2012 |
| CN | 210133884 U | 3/2020 |
| CN | 114000161 A | 2/2022 |
| JP | 2008261392 A | 10/2008 |

OTHER PUBLICATIONS

Guo Zhifan et al., "Status and problems of cryogenic liquid hydrogen storage", Cryo. & Supercond., vol. 47, No. 6, 2019, pp. 21-29.

* cited by examiner

*Primary Examiner* — Paul A Wartalowicz

(57) ABSTRACT

An integrated system for hydrogen purification, storage, and pressurization, including a first heat exchanger, a second heat exchanger, a third heat exchanger, a fourth heat exchanger, a hydrogen storage tank, an adjustable heat and cold source; a gas pump, a first circulation pump, a second circulation pump, a third circulation pump and a fourth circulation pump. The first heat exchanger is provided with a first low-pressure metal hydride reactor. The second heat exchanger is provided with a second low-pressure metal hydride reactor. The third heat exchanger is provided with a medium-pressure metal hydride reactor. The fourth heat exchanger is provided with a high-pressure metal hydride reactor. The first low-pressure metal hydride reactor is connected to the second low-pressure metal hydride reactor, and the medium-pressure metal hydride reactor is connected to the high-pressure metal hydride reactor. An integrated method for hydrogen purification, storage, and pressurization is also provided.

7 Claims, 1 Drawing Sheet

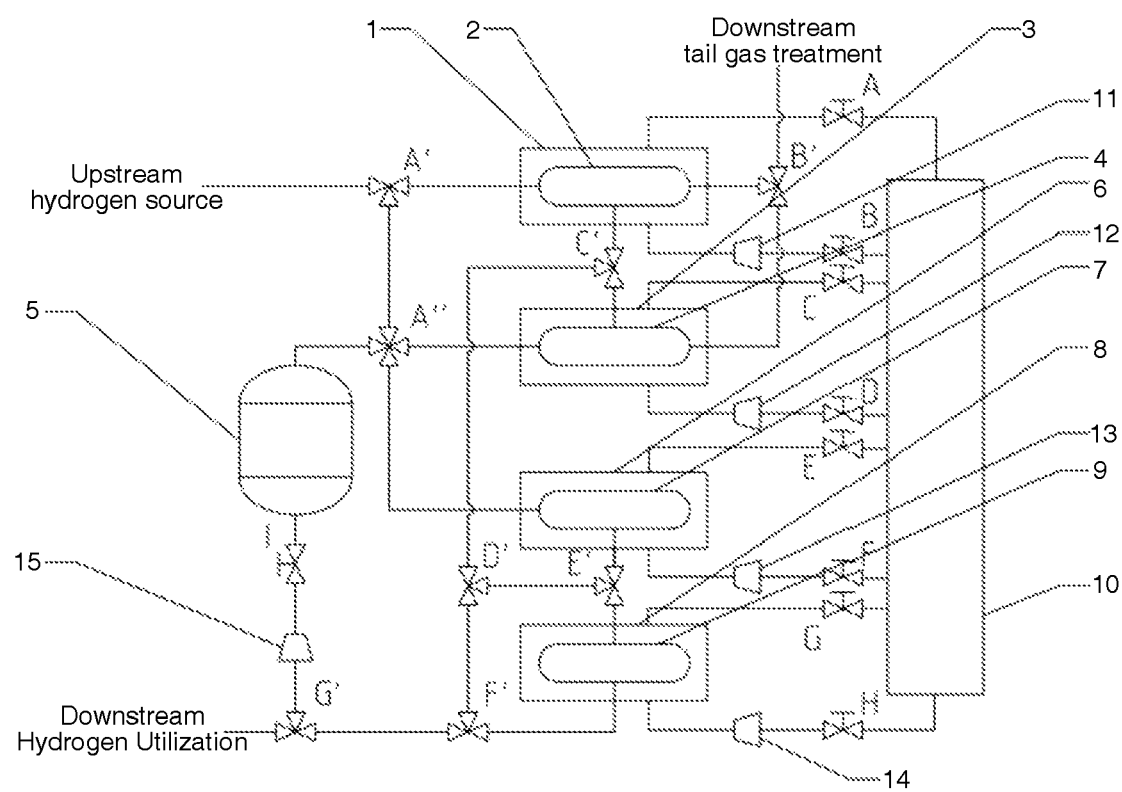

INTEGRATED SYSTEM AND METHOD FOR HYDROGEN PURIFICATION, STORAGE AND PRESSURIZATION

CROSS-REFERENCE TO RELATED APPLICATIONS

This application claims the benefit of priority from Chinese Patent Application No. 202210853095.6, filed on Jul. 6, 2022. The content of the aforementioned application, including any intervening amendments thereto, is incorporated herein by reference in its entirety.

TECHNICAL FIELD

This application relates to purification, storage and multi-stage pressurization of hydrogen, and more particularly to an integrated system and method for hydrogen purification, storage and pressurization.

BACKGROUND

Hydrogen, as the most promising renewable energy source in the $21^{st}$ century, has received worldwide attention because of the high energy density and zero tail gas pollution.

Various hydrogen storage methods have been proposed for different application conditions. In terms of existence states of hydrogen, the existing storage methods can be divided into three major categories: high-pressure gaseous hydrogen storage, low-temperature liquid hydrogen storage, and solid-state hydrogen storage. The solid-state hydrogen storage mainly includes physical adsorption hydrogen storage, metal hydride hydrogen storage, complex hydride hydrogen storage, and direct hydrolysis-based hydrogen production. Various hydrogen storage technologies have their own advantages and disadvantages (Chao-Ling Wu, Yong-Tao Li, Yuan Li. Hydrogen storage and transportation [M]. Chemical Industry Press, 2020.)

Among the above-mentioned hydrogen storage technologies, the high-pressure gaseous hydrogen storage technology has a wider application, in which the gaseous hydrogen is compressed to a high-pressure state at room temperature and stored in the hydrogen storage vessel. The pressure specifications of current high-pressure hydrogen cylinders are mainly 15, 35 and 70 MPa, and the 15 MPa high-pressure hydrogen cylinder is relatively widely used. The hydrogen storage steel cylinders have relatively mature manufacturing process, but the low-pressure hydrogen will lead to huge cylinder volume and mass, small hydrogen storage density per unit volume and low hydrogen storage efficiency. The 35 MPa and 70 MPa high-pressure hydrogen cylinders are mainly used in vehicles such as automobiles and unmanned aerial vehicles. Regarding the low-temperature liquid hydrogen storage technology, hydrogen is liquefied and stored in a container with good insulation performance, which is preferably equipped with a cooling device to reduce the vaporization of liquid hydrogen. Although the low-temperature liquid hydrogen storage is far superior to the high-pressure gaseous hydrogen storage in hydrogen storage density (the liquid hydrogen density is about 850 times that of hydrogen under standard conditions), the production and storage of liquid hydrogen is complicated, and involves the large consumption of energy (Zhi-Fan Guo, Yong-Lin Ju. Status and problems of cryogenic liquid hydrogen storage [J]. Cryogenics and Superconductivity, 2019, 47(06): 21-29). The solid-state hydrogen storage is based on the hydrogen-adsorbing ability of hydrogen storage materials to enable the solid-state hydrogen storage, which has large volumetric hydrogen density but low gravimetric hydrogen density. Moreover, the absorption and desorption rate of hydrogen is limited by the heat transfer characteristics of the hydrogen storage materials.

With regard to different hydrogen application objects and conditions, different hydrogen storage devices are required to meet different hydrogen purity and pressure requirements, and accordingly, various hydrogen filling stations are required. In this case, different safety standards and specifications should be formulated, and special safety maintenance personnel and facilities are required. The lack of unified standard and universal applicability will make the hydrogen management extremely complicated.

SUMMARY

To solve the problems of high hydrogen storage pressure, low hydrogen storage density, large space occupation of hydrogen storage equipment, and unbalance between hydrogen demand and hydrogen supply in the existing hydrogen storage technologies, this application provides an integrated system and method for hydrogen purification, storage, and pressurization.

Technical solutions of this application are described as follows.

In a first aspect, this application provides an integrated system for hydrogen purification, storage and pressurization, including:
  a first heat exchanger;
  a second heat exchanger;
  a third heat exchanger;
  a fourth heat exchanger;
  a hydrogen storage tank;
  an adjustable heat and cold source;
  a gas pump;
  a first circulation pump;
  a second circulation pump;
  a third circulation pump; and
  a fourth circulation pump;
  wherein the first heat exchanger is provided with a first low-pressure metal hydride reactor; the second heat exchanger is provided with a second low-pressure metal hydride reactor; the third heat exchanger is provided with a medium-pressure metal hydride reactor; and the fourth heat exchanger is provided with a high-pressure metal hydride reactor;
  the first low-pressure metal hydride reactor is connected to the second low-pressure metal hydride reactor; and the medium-pressure metal hydride reactor is connected to the high-pressure metal hydride reactor;
  an outlet of the first low-pressure metal hydride reactor, an outlet of the second low-pressure metal hydride reactor, an outlet of the medium-pressure metal hydride reactor and an outlet of the high-pressure metal hydride reactor are connected to the gas pump, and the gas pump is connected to the hydrogen storage tank;
  an inlet of the first heat exchanger is connected to the first circulation pump; an outlet of the first heat exchanger is connected to the adjustable heat and cold source via a first two-way valve; and the first circulation pump is connected to the adjustable heat and cold source via a second two-way valve;
  an inlet of the second heat exchanger is connected to the second circulation pump; an outlet of the second heat exchanger is connected to the adjustable heat and cold source via a third two-way valve; and the second circulation pump is connected to the adjustable heat and cold source via a fourth two-way valve;

an inlet of the third heat exchanger is connected to the third circulation pump; an outlet of the third heat exchanger is connected to the adjustable heat and cold source via a fifth two-way valve; and the third circulation pump is connected to the adjustable heat and cold source via a sixth two-way valve; and an inlet of the fourth heat exchanger is connected to the fourth circulation pump; an outlet of the fourth heat exchanger is connected to the adjustable heat and cold source via a seventh two-way valve; and the fourth circulation pump is connected to the adjustable heat and cold source via an eighth two-way valve.

In an embodiment, the first low-pressure metal hydride reactor and the second low-pressure metal hydride reactor are both connected to a hydrogen source.

In an embodiment, an outlet of the hydrogen storage tank is connected to the first low-pressure metal hydride reactor or the second low-pressure metal hydride reactor.

In an embodiment, the outlet of the first low-pressure metal hydride reactor and the outlet of the second low-pressure metal hydride reactor are connected to a tail gas treatment unit via a second three-way valve.

In an embodiment, the first low-pressure metal hydride reactor and the second low-pressure metal hydride reactor are loaded with a first hydrogen storage material; the medium-pressure metal hydride reactor is loaded with a second hydrogen storage material; the high-pressure metal hydride reactor is loaded with a third hydrogen storage material; the first hydrogen storage material, the second hydrogen storage material and the third hydrogen storage material vary in hydrogen absorption-desorption pressure grade; and the first hydrogen storage material, the second hydrogen storage material and the third hydrogen storage material are independently a hydrogen storage alloy or a hydrogen storage pure metal.

In an embodiment, the hydrogen storage alloy is selected from the group consisting of $LaNi_5$-based alloy and derivatives thereof, $MnNi_5$-based alloy and derivatives thereof, TiFe-based alloy and derivatives thereof, and $Mg_2Ni$-based and derivatives thereof; and the hydrogen storage pure metal is selected from the group consisting of magnesium, aluminum, lithium and calcium.

This application further provides a method for integrated hydrogen purification, storage and pressurization by using the integrated system, comprising:

under an action of the adjustable cold and heat source, desorbing the primarily-pressurized hydrogen stored in a metal hydride in the first low-pressure metal hydride reactor or the second low-pressure metal hydride reactor; feeding the primarily-pressurized hydrogen into the medium-pressure metal hydride reactor to undergo hydrogen absorption reaction under the action of the adjustable cold and heat source; storing an unreacted part of the primarily-pressurized hydrogen in the hydrogen storage tank; according to a downstream hydrogen demand, setting a reaction temperature of the medium-pressure metal hydride reactor, and under the action of the adjustable cold and heat source, performing hydrogen desorbing reaction to enable hydrogen compression and output secondarily-pressurized hydrogen;

desorbing hydrogen stored in the medium-pressure metal hydride reactor under the action of the adjustable cold and heat source to generate the secondarily-pressurized hydrogen; feeding the secondarily-pressurized hydrogen to the high-pressure metal hydride reactor followed by hydrogen absorption reaction under the action of the adjustable cold and heat source, wherein an unreacted part of the secondarily-pressurized hydrogen is stored in the hydrogen storage tank; according to a downstream hydrogen demand, setting a reaction temperature of the high-pressure metal hydride reactor, and under the action of the adjustable cold and heat source, performing hydrogen desorbing reaction in the high-pressure metal hydride reactor to output tertiarily-pressurized hydrogen, wherein a pressure of the tertiarily-pressurized hydrogen is higher than that of the secondarily-pressurized hydrogen; and under the action of the adjustable cold and heat source, heating a hydrogen storage alloy or pure metal through the first heat exchanger to perform hydrogen absorption reaction to store hydrogen released from hydrogen resource and fed into the first low-pressure metal hydride reactor; under the action of the adjustable cold and heat source, subjecting the metal hydride in the second low-pressure metal hydride reactor to hydrogen desorbing reaction; feeding desorbed hydrogen to the first low-pressure metal hydride reactor through the hydrogen storage tank to purge residual impurity tail gas for the completion of hydrogen purification and storage.

Compared to the prior art, this application has the following beneficial effects.

This application realizes the integrated purification, storage and pressurization of hydrogen by means of the metal hydride. The hydrogen storage alloy or pure metal in the metal hydride reactor can directly react reversibly with hydrogen under suitable temperature and pressure conditions to produce the metal hydride. Based on the pressure-composition-temperature (PCT) characteristics of metal hydride, by setting different reaction temperatures, the low-pressure absorption and high-pressure desorption of hydrogen can be realized to achieve the pressurization. Compared with high-pressure gaseous hydrogen storage and low-temperature liquid hydrogen storage, the metal hydride-based hydrogen storage has higher safety, less energy consumption, simpler equipment and cheaper materials, high-purity hydrogen at different pressure levels can be produced. After finishing hydrogen absorption process in the reactors, the residual impurity tail gas is pumped away, and the hydrogen stored in the hydrogen storage tank, or part of the hydrogen released by heating in another reactor is used for purging impurity tail gas to ensure the purity of desorbed hydrogen and obtain high-purity hydrogen for downstream use. The system is equipped with multi-stage metal hydride reactors to complete the multi-stage hydrogen pressurization, thereby satisfying various pressure requirements.

Further, since the hydrogen storage alloy or hydrogen storage pure metal in the metal hydride reactor can directly react reversibly with hydrogen under appropriate temperature and pressure conditions to produce metal hydride. According to the PCT characteristics of metal hydride, the system can absorb low-pressure hydrogen at low temperature and release high-pressure hydrogen at high temperature, while having a high activity on the surface. Using the metal hydride method not only has the outstanding advantages of easy operation, low material cost, relatively simple equipment and process, reliable work, and flexible and variable pressure of hydrogen products on demand, but also can obtain high purity hydrogen products.

Further, the system is equipped with three-stage metal hydride reactors of low pressure, medium pressure and high pressure, each of which is equipped with hydrogen storage alloy or hydrogen storage pure metal of different hydrogen absorption and desorbing pressure levels. According to the PCT characteristic curves of different hydrogen absorption and desorbing reactions, different reaction temperatures are set for each level of metal hydride reactors, and hydrogen absorption and desorption reactions occur in turn to realize multi-stage compression of hydrogen and meet the hydrogen pressure requirement in the actual working conditions of downstream hydrogen utilization devices.

Further, the system utilizes the selective absorption of hydrogen by the hydrogen storage alloy or the hydrogen storage pure metal, and can realize the purification of hydrogen from the upstream conventional process. The metal hydride desorbs high-purity hydrogen products to meet the use demand, which has the outstanding advantages of simple operation, low material cost, relatively simple equipment and process, reliable work, good selectivity, variable hydrogen products on demand and high purity.

Further, the system is equipped with two low-pressure metal hydride reactors, one of which undergoes hydrogen absorption reaction for storage and purification upstream of hydrogen source, and while the other undergoes hydrogen desorption reaction, hydrogen passes through the hydrogen storage tank for purging the residual impurity tail gas from the reactor.

Further, the system is equipped with the hydrogen storage tank for storing the remaining hydrogen desorbed from a hydrogen desorption reaction in the metal hydride reactor but not fully utilized. The stored low-pressure hydrogen can be used as the gas for purging the residual impurity tail gas in the low-pressure metal hydride reactor or as the hydrogen source for the hydrogen absorption reaction occurring in the medium-pressure metal hydride reactor.

The application makes use of the high hydrogen storage capacity, the stability under normal temperature and pressure conditions, and the high cycle life of hydrogen absorption and desorption of metal hydride to achieve safe hydrogen storage and utilization in hydrogen application sites. Compared with the current widely used method of gaseous hydrogen storage by using high-pressure gas cylinders, the safety is better guaranteed and improved, the current requirement of high frequency inspection of hydrogen storage safety is weakened, and safety and security facilities of hydrogen storage are simplified.

BRIEF DESCRIPTION OF THE DRAWINGS

The FIGURE is a schematic diagram of a metal hydride-based integrated system for hydrogen purification, storage, and pressurization according to one embodiment of the present disclosure.

In the FIGURE: 1-first heat exchanger; 2-first low-pressure metal hydride reactor; 3-second heat exchanger; 4-second low-pressure metal hydride reactor; 5-hydrogen storage tank; 6-third heat exchanger; 7-medium-pressure metal hydride reactor; 8-fourth heat exchanger; 9-high-pressure metal hydride reactor; 10-adjustable heat and cold source; 11-first circulation pump; 12-second circulation pump; 13-third circulation pump; 14-fourth circulation pump; 15-gas pump; A-first two-way valve; B-second two-way valve; C-third two-way valve; D-fourth two-way valve; E-fifth two-way valve; F-sixth two-way valve; G-seventh two-way valve; H-eighth two-way valve; I-ninth two-way valve; A'-first three-way valve; B'-second three-way valve; C'-third three-way valve; D'-fourth three-way valve; E'-fifth three-way valve; F'-sixth three-way valve; G'-seventh three-way valve; and A"-four-way valve.

DETAILED DESCRIPTION OF EMBODIMENTS

The disclosure will be further described in detail below in conjunction with the accompanying drawings and embodiments, and the drawings are not intended to limit the disclosure.

In order to realize safe and convenient storage and flexible use of hydrogen on demand, the disclosure provides an integrated system and method for hydrogen purification, storage, and pressurization, which, based on the different pressure-composition-temperature (PCT) characteristics of different metal hydrides, have the advantages of safe hydrogen storage, purification and impurity removal, flexible output and use of hydrogen pressure on demand.

Referring to FIGURE, an integrated system for hydrogen purification, storage, and pressurization includes a first heat exchanger 1, a second heat exchanger 3, a third heat exchanger 6, a fourth heat exchanger 8, a hydrogen storage tank 5, an adjustable cold and heat source 10, a first circulation pump 11, a second circulation pump 12, a third circulation pump 13, a fourth circulation pump 14, and a gas pump 15.

The first heat exchanger 1 is provided with a first low-pressure metal hydride reactor 2. The second heat exchanger 3 is provided with a second low-pressure metal hydride reactor 4. The third heat exchanger 6 is provided with a medium-pressure metal hydride reactor 7. The fourth heat exchanger 8 is provided with a high-pressure metal hydride reactor 9. A pressure in the high-pressure metal hydride reactor 9 is higher than that in the medium-pressure metal hydride reactor 7, and a pressure in the medium-pressure metal hydride reactor 7 is higher than that in the first low-pressure metal hydride reactor 2 and that in the second low-pressure metal hydride reactor 4.

The first low-pressure metal hydride reactor 2 and the second low-pressure metal hydride reactor 4 are loaded with a first hydrogen storage material. The medium-pressure metal hydride reactor 7 is loaded with a second hydrogen storage material. The high-pressure metal hydride reactor 9 is loaded with a third hydrogen storage material. The first hydrogen storage material, the second hydrogen storage material and the third hydrogen storage material vary in hydrogen absorption-desorption pressure grade. The first hydrogen storage material, the second hydrogen storage material and the third hydrogen storage material are independently a hydrogen storage alloy or a hydrogen storage pure metal.

The hydrogen storage alloy or the hydrogen storage pure metal can be selected according to the actual operating temperature conditions and hydrogen pressure requirements. The hydrogen storage alloys include, but are not limited to, $LaNi_5$ and derivatives thereof, $MmNi_5$ and derivatives thereof, TiFe and derivatives thereof, and $Mg_2Ni$-based alloy and derivatives thereof. The hydrogen storage pure metals include, but are not limited to, magnesium, aluminum, lithium, and calcium.

The outlet of the upstream hydrogen supply device is connected to the inlet of the first three-way valve A'. The first outlet of the first three-way valve A' is connected to the first interface of the four-way valve A". The second interface of the four-way valve A" is connected to the second low-pressure metal hydride reactor 4. The third interface of the four-way valve A" is connected to the medium-pressure metal hydride reactor 7. The fourth interface of the four-way valve A″ is connected to the outlet of the hydrogen storage tank 5.

The second outlet of the first three-way valve A′ is connected to the first low-pressure metal hydride reactor 2.

The first low-pressure metal hydride reactor 2 is connected to the second low-pressure metal hydride reactor 4 via the third three-way valve C′. The medium-pressure metal hydride reactor 7 is connected to the high-pressure metal hydride reactor 9 via the fifth three-way valve E′.

Both the first outlet of the first low-pressure metal hydride reactor 2 and the first outlet of the second low-pressure metal hydride reactor 4 are connected to the gas pump 15 via the third three-way valve C′, the fourth three-way valve D′, the sixth three-way valve F′, and the seventh three-way valve G′.

The outlet of the medium-pressure metal hydride reactor 7 is connected to the gas pump 15 via the fifth three-way valve E′, the fourth three-way valve D′, the sixth three-way valve F′, and the seventh three-way valve G′.

The outlet of the high-pressure metal hydride reactor 9 is connected to the gas pump 15 via the sixth three-way valve F′ and the seventh three-way valve G′.

The gas pump 15 is connected to the hydrogen storage tank 5 via the ninth two-way valve I.

The seventh three-way valve G′ is connected to the downstream hydrogen utilization unit.

Both the second outlet of the first low-pressure metal hydride reactor 2 and the second outlet of the second low-pressure metal hydride reactor 4 are connected to the downstream tail gas treatment unit via the second three-way valve B′.

The inlet of the first heat exchanger 1 is connected to the first circulation pump 11, and the first circulation pump 11 is connected to the adjustable heat and cold source 10 via the second two-way valve B. The inlet of the second heat exchanger 3 is connected to the second circulation pump 12, and the second circulation pump 12 is connected to the adjustable heat and cold source 10 via the fourth two-way valve D. The inlet of the third heat exchanger 6 is connected to the third circulation pump 13, and the third circulation pump 13 is connected to the adjustable heat and cold source 10 via the sixth two-way valve F. The inlet of the fourth heat exchanger 8 is connected to the fourth circulation pump 14, and the fourth circulation pump 14 is connected to the adjustable heat and cold source 10 via the eighth two-way valve H.

The outlet of the first heat exchanger 1 is connected to the adjustable heat and cold source 10 via the first two-way valve A. The outlet of the second heat exchanger 3 is connected to the adjustable heat and cold source 10 via the third two-way valve C. The outlet of the third heat exchanger 6 is connected to the adjustable heat and cold source via the fifth two-way valve E. The outlet of the fourth heat exchanger 8 is connected to the adjustable heat and cold source 10 via the seventh two-way valve G.

The method for integrated hydrogen purification, storage, and pressurization by the using integrated system includes the following steps.

For hydrogen purification and storage, hydrogen from the upstream hydrogen supply device enters the first low-pressure metal hydride reactor 2 (or the second low-pressure metal hydride reactor 4) through the hydrogenation pipeline of the reactors. Under the action of the adjustable cold and heat source 10, the hydrogen storage alloy or hydrogen storage pure metal is heated by the first heat exchanger 1 (or the second heat exchanger 3) to undergo hydrogen absorption reaction and store hydrogen. After undergoing hydrogen absorption reaction, the residual impurity tail gas is discharged from the system by the second three-way valve B′. Under the action of the adjustable cold and heat source 10, the metal hydride in the second low-pressure metal hydride reactor 4 (or the first low-pressure metal hydride reactor 2) undergoes the hydrogen desorption reaction, and the desorbed hydrogen is fed to the first low-pressure metal hydride reactor 2 (or the second low-pressure metal hydride reactor 4) through the hydrogen storage tank 5, and purges the residual impurity tail gas remaining in the reactor, thereby completing the hydrogen purification and storage process.

For hydrogen pressurization, under the action of the adjustable cold and heat source 10, the hydrogen from the metal hydride in the first low-pressure metal hydride reactor 2 or the second low-pressure metal hydride reactor 4 undergoes hydrogen desorbing reaction. The desorbed primarily-pressurized hydrogen is fed into the medium-pressure metal hydride reactor 7 to undergo hydrogen absorption reaction under the action of the adjustable cold and heat source 10. The unreacted part of the primarily-pressurized hydrogen is stored in the hydrogen storage tank 5 for purging residual impurity tail gas. Then, according to the downstream hydrogen demand, the reaction temperature of the medium-pressure metal hydride reactor 7 is set. Under the action of the adjustable cold and heat source 10, the hydrogen desorption reaction is performed to enable hydrogen compression and output secondarily-pressurized hydrogen. The pressure of the secondarily-pressurized hydrogen is higher than that of the primarily-pressurized hydrogen.

Similarly, hydrogen stored in the medium-pressure metal hydride reactor 7 is desorbed under the action of the adjustable cold and heat source 10 to generate the secondarily-pressurized hydrogen. The secondarily-pressurized hydrogen is fed into the high-pressure metal hydride reactor 9 followed by hydrogen absorption reaction under the action of the adjustable cold and heat source 10. The unreacted part of the secondarily-pressurized hydrogen is stored in the hydrogen storage tank 5 for purging residual impurity tail gas. Then, the reaction temperature of the high-pressure metal hydride reactor 9 is set according to the downstream hydrogen demand. Under the action of the adjustable cold and heat source 10, the hydrogen desorbing reaction is performed in the high-pressure metal hydride reactor 9 to output the tertiarily-pressurized hydrogen. The pressure of the tertiarily-pressurized hydrogen is higher than that of the secondarily-pressurized hydrogen.

In an embodiment, by setting multiple low-pressure metal hydride reactors in the system, within a certain period, hydrogen absorption reaction occurs in some of the low-pressure metal hydride reactors, and hydrogen desorption reaction occurs in the rest of the low-pressure stage reactors. Then, at the next certain period, hydrogen desorption reaction occurs in the former, and hydrogen absorption reaction occurs in the latter. The reactions are repeated to realize continuous purification treatment of impure hydrogen.

In this embodiment, the first low-pressure metal hydride reactor 2 is in the hydrogen absorption state, and the second low-pressure metal hydride reactor 4 is in the hydrogen desorbing state, to illustrate the flow direction of hydrogen gas in the system. The first three-way valve A′ is opened. The interface connecting the second three-way valve B′ to the second low-pressure metal hydride reactor 4 is closed. The interface connecting the third three-way valve C′ to the first low-pressure metal hydride reactor 2 is closed. The interface connecting the fourth three-way valve D′ to the medium-pressure metal hydride reactor 7 is closed. The interface connecting the sixth three-way valve F′ to the high-pressure metal hydride reactor 9 is closed. The interface connecting the seventh three-way valve G' to the downstream hydrogen utilization unit is closed. The ninth two-way valve I is opened. The interface connecting the four-way valve A" to the second low-pressure metal hydride reactor 4 is closed. The interface connecting the four-way valve A" to the medium-pressure metal hydride reactor 7 is closed. The impure hydrogen from the upstream hydrogen source enters the first low-pressure metal hydride reactor 2 and is stored in the low-pressure hydrogen storage alloys or the hydrogen storage pure metals. After the hydrogen absorption process is completed, the interface between the first three-way valve A' and the first low-pressure metal hydride reactor 2 is closed. The impure hydrogen will not be fed into the system. The impure gas is discharged from the system through the second three-way valve B'. The hydrogen desorbed from the metal hydride in the second low-pressure metal hydride reactor 4 is discharged in turn through the gas pump 15 and the hydrogen storage tank 5 into the first low-pressure metal hydride reactor 2 to purge the residual impurity tail gas in the reactor. And at the next stage, the second low-pressure metal hydride reactor 4 is in the hydrogen absorption state, and the first low-pressure metal hydride reactor 2 is in the hydrogen desorbing state.

In particular, the hydrogen absorption and desorption capacity under different conditions depend on the PCT characteristics of the hydrogen storage material. Before the hydrogen desorption reaction occurs in the metal hydride reactors at all levels, the adjustable cold and heat source 10 supplies heat to the metal hydride reactors through the circulation pump and the heat exchanger to raise the hydrogen desorption reaction temperature of the metal hydride. Some hydrogen gas escapes early during the heating process due to the change of hydrogen storage capacity of the metal hydride. The pressure level is not enough to meet the demand of next stage hydrogen reactor or downstream hydrogen utilization unit, and therefore, this part of hydrogen is stored in the hydrogen storage tank 5 by the gas pump 15 as the gas for purging residual impurity tail gas, the gas for absorption reaction in the medium-pressure metal hydride reactor 7 or the gas for the downstream low-pressure hydrogen utilization.

Valves are provided in the pipelines between individual units to control the working status of the system.

In the disclosure, the hydrogen storage alloys (ABS type, AB type, A2B type, etc.) and the hydrogen storage pure metals are used as the medium, thereby making use of the PCT characteristic curve of hydrogen storage material and the feature of selectively absorbing hydrogen to store hydrogen in the metal hydride with excellent stability, thereby recovering hydrogen from industrial grade hydrogen with low purity and releasing experimental grade hydrogen with high purity. At the same time, the system has the function of hydrogen compression to meet the demand of downstream hydrogen utilization process and solve the current problems of safe hydrogen storage and flexible supply of hydrogen on demand.

The disclosure will be further described according to the following embodiment.

Hydrogen from upstream production is stored. The hydrogen storage material in the low-pressure metal hydride reactor is $La_{0.4}Ce_{0.4}Ca_{0.2}Ni_5$. The upstream hydrogen source fills the first low-pressure metal hydride reactor 2 with hydrogen for the hydrogen absorption reaction to store and purify hydrogen. In the tail gas exclusion system, after finishing the hydrogen absorption, the high-purity hydrogen stored in the hydrogen storage tank 5 purges the impurity tail gas residue in the first low-pressure metal hydride reactor 2. At the same time, the second low-pressure metal hydride reactor 4 selectively undergoes the hydrogen desorption reaction to provide low-pressure high-purity hydrogen for purging the residual impurity tail gas. The hydrogen absorption and the desorption reaction of the two low-pressure stage metal hydride reactors are carried out alternately.

The hydrogen from the upstream process is pressurized in multiple stages. The hydrogen storage material in the low-pressure metal hydride reactor is $Mm_{0.2}La_{0.6}Ca_{0.2}Ni_5$. The temperature of the low-pressure hydrogen absorption is 20° C., and the pressure is 1.25 MPa. The temperature of the high-pressure hydrogen desorbing is 99° C., and the pressure is 9.86 MPa. The absorption and desorbing processes of hydrogen are carried out sequentially to achieve the first stage of hydrogen pressurization. The hydrogen storage material in the medium-pressure metal hydride reactor 7 is $TiCrMn_{0.55}Fe_{0.3}V_{0.15}$. The temperature of the low-pressure hydrogen absorption is 20° C., and the pressure is 8 MPa. The temperature of the high-pressure hydrogen desorbing is 60° C., and the pressure is 20 MPa. The absorption and desorbing processes of hydrogen are carried out sequentially to achieve the second stage of hydrogen pressurization. The hydrogen storage material in the high-pressure metal hydride reactor 9 is $Ti_{1.08}Cr_{1.3}Mn_{0.2}Fe_5$. The temperature of the low-pressure hydrogen absorption is 25° C., and the pressure is 14 MPa. The temperature of the high-pressure hydrogen desorbing is 90° C., and the pressure is 89.19 MPa. The absorption and desorbing processes of hydrogen are carried out sequentially to achieve the third stage of hydrogen pressurization.

In the disclosure, hydrogen from industrial production enters the metal hydride reactor, and under the action of the heat flow medium supplied to the heat exchanger by the adjustable cold and heat source 10, hydrogen absorption reaction occurs in the hydrogen storage alloy or hydrogen storage pure metal in the reactor, and the residual impurity gas is discharged from the system to realize the purification and solid state storage of hydrogen; using low-pressure stage high-purity hydrogen stored in the hydrogen storage tank 5 generated by the hydrogen desorption reaction of the low-pressure metal hydride reactor or by the difference in hydrogen storage capacity purges the tail gas residue in the reactor; the lower pressure stage reactor provides lower pressure hydrogen through the hydrogen desorption reaction for the higher pressure stage reactor to undergo hydrogen absorption reaction to realize multi-stage pressurization of hydrogen; the PCT characteristics of different hydrogen storage alloys or hydrogen storage pure metals are utilized to realize on-demand output and utilization of hydrogen at different pressures by changing the reaction temperature of the reactor.

The present disclosure provides a suitable hydrogen storage method with improved safety while achieving on-demand supply of hydrogen to realize the supply of most hydrogen purity and pressure demand ranges and universalization of hydrogen refueling sites, which will have very significant economic and social benefits.

What is claimed is:
1. An integrated system for hydrogen purification, storage, and pressurization, comprising:
    a first heat exchanger;
    a second heat exchanger;
    a third heat exchanger;
    a fourth heat exchanger;
    a hydrogen storage tank;
    an adjustable heat and cold source;

a gas pump;
a first circulation pump;
a second circulation pump;
a third circulation pump; and
a fourth circulation pump;
wherein the first heat exchanger is provided with a first low-pressure metal hydride reactor; the second heat exchanger is provided with a second low-pressure metal hydride reactor; the third heat exchanger is provided with a medium-pressure metal hydride reactor; and the fourth heat exchanger is provided with a high-pressure metal hydride reactor;
the first low-pressure metal hydride reactor is connected to the second low-pressure metal hydride reactor; and the medium-pressure metal hydride reactor is connected to the high-pressure metal hydride reactor;
an outlet of the first low-pressure metal hydride reactor, an outlet of the second low-pressure metal hydride reactor, an outlet of the medium-pressure metal hydride reactor and an outlet of the high-pressure metal hydride reactor are connected to the gas pump, and the gas pump is connected to the hydrogen storage tank;
an inlet of the first heat exchanger is connected to the first circulation pump; an outlet of the first heat exchanger is connected to the adjustable heat and cold source via a first two-way valve; and the first circulation pump is connected to the adjustable heat and cold source via a second two-way valve;
an inlet of the second heat exchanger is connected to the second circulation pump; an outlet of the second heat exchanger is connected to the adjustable heat and cold source via a third two-way valve; and the second circulation pump is connected to the adjustable heat and cold source via a fourth two-way valve;
an inlet of the third heat exchanger is connected to the third circulation pump; an outlet of the third heat exchanger is connected to the adjustable heat and cold source via a fifth two-way valve; and the third circulation pump is connected to the adjustable heat and cold source via a sixth two-way valve; and
an inlet of the fourth heat exchanger is connected to the fourth circulation pump; an outlet of the fourth heat exchanger is connected to the adjustable heat and cold source via a seventh two-way valve; and the fourth circulation pump is connected to the adjustable heat and cold source via an eighth two-way valve.

2. The integrated system of claim 1, wherein the first low-pressure metal hydride reactor and the second low-pressure metal hydride reactor are both connected to a hydrogen source.

3. The integrated system of claim 1, wherein an outlet of the hydrogen storage tank is connected to the first low-pressure metal hydride reactor or the second low-pressure metal hydride reactor.

4. The integrated system of claim 1, wherein the outlet of the first low-pressure metal hydride reactor and the outlet of the second low-pressure metal hydride reactor are connected to a tail gas treatment unit via a three-way valve.

5. The integrated system of claim 1, wherein the first low-pressure metal hydride reactor and the second low-pressure metal hydride reactor are loaded with a first hydrogen storage material; the medium-pressure metal hydride reactor is loaded with a second hydrogen storage material; the high-pressure metal hydride reactor is loaded with a third hydrogen storage material; the first hydrogen storage material, the second hydrogen storage material, and the third hydrogen storage material vary in hydrogen absorption-desorption pressure grade; and the first hydrogen storage material, the second hydrogen storage material, and the third hydrogen storage material are independently a hydrogen storage alloy or a hydrogen storage pure metal.

6. The integrated system of claim 5, wherein the hydrogen storage alloy is selected from the group consisting of $LaNi_5$-based alloy and derivatives thereof, $MmNi_5$-based alloy and derivatives thereof, TiFe-based alloy and derivatives thereof, and $Mg_2Ni$-based and derivatives thereof; and the hydrogen storage pure metal is selected from the group consisting of magnesium, aluminum, lithium and calcium.

7. A method for integrated hydrogen purification, storage and pressurization by using the integrated system of claim 1, comprising:
under an action of the adjustable cold and heat source, desorbing primarily-pressurized hydrogen stored in a metal hydride in the first low-pressure metal hydride reactor or the second low-pressure metal hydride reactor; feeding desorbed hydrogen into the medium-pressure metal hydride reactor to undergo hydrogen absorption reaction under the action of the adjustable cold and heat source; storing an unreacted part of the desorbed hydrogen in the hydrogen storage tank; according to a downstream hydrogen demand, setting a reaction temperature of the medium-pressure metal hydride reactor, and under the action of the adjustable cold and heat source, performing hydrogen desorption reaction to enable hydrogen compression and output secondarily-pressurized hydrogen, wherein a pressure of the secondarily-pressurized hydrogen is higher than that of the primarily-pressurized hydrogen;
desorbing hydrogen stored in the medium-pressure metal hydride reactor under the action of the adjustable cold and heat source to generate the secondarily-pressurized hydrogen; feeding the secondarily-pressurized hydrogen to the high-pressure metal hydride reactor followed by hydrogen absorption reaction under the action of the adjustable cold and heat source, wherein an unreacted part of the secondarily-pressurized hydrogen is stored in the hydrogen storage tank; according to a downstream hydrogen demand, setting a reaction temperature of the high-pressure metal hydride reactor, and under the action of the adjustable cold and heat source, performing hydrogen desorbing reaction in the high-pressure metal hydride reactor to output tertiarily-pressurized hydrogen, wherein a pressure of the tertiarily-pressurized hydrogen is higher than that of the secondarily-pressurized hydrogen; and
allowing hydrogen to enter the first low-pressure metal hydride reactor; under the action of the adjustable cold and heat source, heating a hydrogen storage alloy or pure metal through the first heat exchanger to perform hydrogen absorption reaction to store hydrogen; under the action of the adjustable cold and heat source, subjecting the metal hydride in the second low-pressure metal hydride reactor to hydrogen desorption reaction; feeding desorbed hydrogen to the first low-pressure metal hydride reactor through the hydrogen storage tank to complete hydrogen purification and storage.

\* \* \* \* \*